United States Patent
Zhao et al.

(10) Patent No.: US 12,060,973 B2
(45) Date of Patent: Aug. 13, 2024

(54) SYSTEM AND METHOD FOR PUMPING LUBRICANT IN GAS PIPELINE

(71) Applicant: SOUTHWEST PETROLEUM UNIVERSITY, Chengdu (CN)

(72) Inventors: Jianguo Zhao, Chengdu (CN); Guorong Wang, Chengdu (CN); Qingyou Liu, Chengdu (CN); Shuo Han, Chengdu (CN); Run Dong, Chengdu (CN); Jiliang Dai, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 419 days.

(21) Appl. No.: 17/372,414

(22) Filed: Jul. 9, 2021

(65) Prior Publication Data
US 2022/0010925 A1 Jan. 13, 2022

(30) Foreign Application Priority Data

Jul. 12, 2020 (CN) .......................... 202010666026.5
Jul. 12, 2020 (CN) .......................... 202010666027.X

(51) Int. Cl.
*F16N 31/00* (2006.01)
*E21B 23/00* (2006.01)
(Continued)

(52) U.S. Cl.
CPC .............. *F16N 31/00* (2013.01); *F16N 29/00* (2013.01); *F17D 5/005* (2013.01); *E21B 23/001* (2020.05);
(Continued)

(58) Field of Classification Search
CPC ....... E21B 37/106; E21B 23/001; B05C 9/02; F16L 55/26; F16L 2101/12;
(Continued)

(56) References Cited

U.S. PATENT DOCUMENTS 6,378,627 B1 * 4/2002 Tubel ................. E21B 17/1078
166/255.2
9,618,418 B2 4/2017 Zhang et al.
(Continued)

FOREIGN PATENT DOCUMENTS

CN 107152529 A * 9/2017
CN 107327687 A * 11/2017
(Continued)

OTHER PUBLICATIONS

CN-107152529-A, Translation (Year: 2017).*
(Continued)

*Primary Examiner* — Daphne M Barry

(57) ABSTRACT

A system for pumping lubricant in a gas transportation pipeline includes a pipeline robot and a control terminal system. The pipeline robot includes a lubricant position detection, module, a lubricant pumping module, an electro-hydraulic control system, a data acquisition and processing system, and a lubricant sucking port. The location at which the lubricant deposits can be detected online, and the lubricant staving in the gas transportation pipeline can be removed in real time. The system is highly automatic and efficient. Resistance against the natural as transportation is reduced effectively, the efficiency of transporting the natural gas is improved, and safety of transporting the natural gas is ensured.

5 Claims, 5 Drawing Sheets

(51) Int. Cl.
*F16L 55/26* (2006.01)
*F16L 101/00* (2006.01)
*F16N 29/00* (2006.01)
*F17D 5/00* (2006.01)

(52) U.S. Cl.
CPC ........... *F16L 55/26* (2013.01); *F16L 2101/00* (2013.01); *F16N 2210/00* (2013.01); *F16N 2230/02* (2013.01); *F16N 2250/00* (2013.01); *F16N 2270/00* (2013.01); *F16N 2280/02* (2013.01)

(58) Field of Classification Search
CPC ...... F16L 2010/70; F16N 31/00; F16N 29/00; F16N 2210/00; F16N 2230/00; F16N 2250/00; F16N 2270/00; F16N 2280/02; F17D 5/005
See application file for complete search history.

(56) References Cited

U.S. PATENT DOCUMENTS

| | | | |
|---|---|---|---|
| 11,542,789 B2 * | 1/2023 | Tang | E21B 34/10 |
| 11,802,463 B2 * | 10/2023 | Haugland | B01D 29/6407 |
| 2008/0142304 A1 * | 6/2008 | Schutz | F16N 7/38 |
| | | | 184/7.4 |
| 2014/0326510 A1 * | 11/2014 | Wessel | E21B 4/04 |
| | | | 175/57 |
| 2015/0337610 A1 * | 11/2015 | Strachan | E21B 21/12 |
| | | | 175/57 |
| 2019/0048718 A1 | 2/2019 | Ouyang et al. | |
| 2021/0163326 A1 | 6/2021 | Ren et al. | |

FOREIGN PATENT DOCUMENTS

| | | | | |
|---|---|---|---|---|
| CN | 111779986 | A | | 10/2020 |
| CN | 111828775 | A | | 10/2020 |
| CN | 113731974 | A * | | 12/2021 |
| CN | 114871216 | B * | | 5/2023 |
| EP | 1939520 | A1 * | 7/2008 | ............... F16N 7/38 |

OTHER PUBLICATIONS

CN-107327687-A, Translation (Year: 2017).*
CN-113731974-A (Year: 2021).*
CN-114871216-B (Year: 2023).*
EP-1939520-A1, Translation (Year: 2008).*

* cited by examiner

SYSTEM AND METHOD FOR PUMPING LUBRICANT IN GAS PIPELINE

CROSS REFERENCE TO RELATED APPLICATIONS

This application claims foreign priority of Chinese Patent Application No. 202010666026.5 with a filing date of Jul. 12, 2020, Chinese Patent Application No. 202010666027.X with a filing date of Jul. 12, 2020 in the China National Intellectual Property Administration, the disclosures of all of which are hereby incorporated by reference.

TECHNICAL FIELD

The present disclosure relates to the field of pipeline maintenance, and in particular to a system and a method for pumping lubricant of a gas pipeline.

BACKGROUND

In recent years, to meet the demand, a scale of Chinese oil and gas pipeline network has been expanding, and a construction and management level of pipelines has been substantially improved. According to the "Medium and Long-term Oil and Gas Pipeline Network Plan", the scale of the national long-distance oil and gas pipeline network will reach 169,000 km by 2020, and will reach 240,000 km by 2025.

The oil and gas pipeline network serves as an artery of energy transmission and has a wide range of applications in the strategic layout of energy in China. However, as operation time of the pipeline increases, the pipeline may have corrosion and defects, and the pipeline may need to be tested, evaluated and maintained in time to avoid casualties and property damage caused by pipeline rupture. The gas that is transported for a long distance may need to be pressurized. Common pressurization devices may include a reciprocating compressor (hereinafter referred to as a compressor) for providing lubricant. A part of the lubricant injected into the compressor may enter a scrubber tank at an entrance of the compressor together with compressed natural gas through a return line in the compressor skid. Another part of the lubricant may enter and may be sealed in a dirt lubricant collection tank through a piston rod. The remaining lubricant may enter a downstream pipeline with the compressed natural gas and further enter a sea pipe. The lubricant may condense and stay in the pipeline while being transported together with the natural gas. When a large amount of lubricant staying in the pipeline, resistance against the natural gas may increase, which may significantly affect safety of natural gas transportation.

It may be necessary to remove the trapped lubricant to reduce the resistance against the natural gas transportation, improve an efficiency of natural gas transportation, and ultimately ensure the safety of natural gas transportation.

The patent Application No. CN201610111812.2 discloses a multi-functional liquid accumulation control valve. When gas flow passes through a vortex flow generator, a vortex motion is generated, and gas carrying capacity is improved. However, the disclosure fails to remove the accumulated liquid completely. The liquid carried by the gas may gather in a next low-lying area. When the device is applied to a long-distance pipeline, a vortex flow pipe needs to be replaced manually, which is inefficient. The vortex motion of the device may drive the liquid nixed with natural gas only.

The patent Application No. CN201510386095.X discloses a method for removing accumulated liquid at the low-lying area of the pipeline and a method for online monitoring corrosion inhibitor. However, in the disclosure, the accumulated liquid is removed by gas lifting. When a liquid level in an accumulation buffer tank is lower than an airflow nozzle, the liquid may not be removed any more, and the gas may rise and leak to pollute the environment.

The patent Application No. CN201920883923.4 discloses a device for removing accumulated liquid in a long-distance natural gas transportation pipeline. The device is configured between the pipelines, connecting an inlet and an outlet to the natural gas pipeline, such that the accumulated liquid may accumulate at a lower part of a drainage pipe. The disclosure may only solve the problem of liquid accumulation at a section of the long-distance pipeline, and integrity of the pipeline may be destroyed. The gas may leak and pollute the environment.

SUMMARY OF THE DISCLOSURE

In order to overcome the problem of being difficult to perform the available technology in the art to pump the lubricant, the present, disclosure provides a system and a method for pumping lubricant in a gas transportation pipeline. Deposited and accumulated lubricant may be pumped through a pumping port arranged by a pipeline robot, and the accumulated lubricant may be removed out of the pipeline through a lubricant channel in an umbilical cable, such that the problem of pumping the lubricant may be solved.

In order to achieve the above technical objective, following technical solutions may be performed.

A system for pumping, lubricant in a gas transportation pipeline includes a pipeline robot and a control terminal system, and the pipeline robot includes a lubricant sucking module and a lubricant position detection module.

In some embodiments, the control terminal system includes a data processing center, a signal transceiver, an input device, a storage unit, and a display. Each of the signal transceiver, the input device, the storage unit, and the display is connected to the data processing center and is controlled by a control module in the data processing center. The display is configured to display coordinates of a three-dimensional trajectory position of the pipeline robot.

In some embodiments, the lubricant pumping module includes an electro-hydraulic control system and a data acquisition and processing system. The electro-hydraulic control system includes a two-position three-way electromagnetic valve, a booster pump, a unidirectional valve A, a unidirectional valve B, a unidirectional valve C, a lubricant collection apparatus, a relief valve, and a power-off normally closed electromagnetic switch valve. Each of the power-off normally closed electromagnetic switch valve and the two-position three-way electromagnetic valve is independently controlled by a DSP. The power-off normally closed electromagnetic switch valve is connected to the two-position three-way electromagnetic valve in series. Two outlets of the two-position three-way electromagnetic valve are connected to the unidirectional valve A and the booster pump respectively. The booster pump is connected in series with the unidirectional valve B. The relief valve, the unidirectional valve A, and the unidirectional valve B are connected in parallel. The relief valve, the unidirectional valve A, and the unidirectional valve B are connected in series with the unidirectional valve C. The unidirectional valve C is further connected in series with the lubricant collection apparatus. The data acquisition and processing system consists of a liquid level detection sensor, a pressor sensor, a gravitational accelerometer, a memory, an AD, and an AD/DA. The liquid level detection sensor is configured to detect the height of the liquid level. The pressure sensor is configured to detect pressure inside the pipeline. The gravitational accelerometer is configured to detect a gravitational direction.

In some embodiments, the lubricant position detection module includes a power supply module, an industrial CCD camera, a non-transitory memory B, a stepper motor A, an ultrasonic liquid level detection sensor, and a gravitational accelerometer B. Each of the stepper motor A, the ultrasonic liquid level detection sensor, and the gravitational accelerometer B is independently controlled by a DSP.

In some embodiments, the lubricant sucking module has 6-10 lubricant sucking ports that are evenly distributed in a circumferential direction. In this way, the efficiency and reliability of sucking the lubricant is improved.

In some embodiments, a unidirectional valve is the only component that is connected in series between the lubricant sucking port and the power-off normally closed electromagnetic switch valve, and the unidirectional valve is conductive unidirectionally. The stepper motor B is configured out of the lubricant sucking port. The lubricant sucking ports are rotated by the stepper motor B to select a predetermined one of the lubricant sucking ports for sucking the lubricant.

In some embodiments, a unidirectional valve and an electromagnetic switch valve are configured to connect in series between the lubricant sucking port and the power-off normally closed electromagnetic switch valve. The electromagnetic switch valve is independently controlled. A predetermined one of the 6-10 lubricant sucking ports is selected for pumping the lubricant by controlling the electromagnetic switch valve to be conductive or nonconductive.

The present disclosure further provides a method for pumping lubricant in a gas transportation pipeline. The method includes: S1, a lubricant position detection module monitoring a lubricant deposition signal inside a pipeline in real time to determine a location at which the lubricant deposits; S2, a lubricant pumping module sending the lubricant deposition signal to the control terminal system, the control terminal system sending a lubricant sucking signal to the lubricant pumping module, an electro-hydraulic control system sucking out the lubricant; and S3: the lubricant being completely sucked out, a electromagnetic valve being turned off, and lubricant suction being terminated.

In some embodiments, the operation of determining the location at which the lubricant deposits includes: S11: the lubricant position detection module calculating a height of a liquid level; and S12: in response to the height of the liquid level being higher than a predetermined height, an industrial CCD camera taking a photo of the gas transportation pipeline, wherein the location at which the lubricant deposits is corrected for a second time based on the photo to determine that the lubricant does deposit at the location.

In some embodiments, the operation S2 includes: S21, when deposition of the lubricant is present, the lubricant pumping module encoding the information and sending the encoded information to the control terminal system; S22, a data processing center of the control terminal system processing the information and sending the lubricant sucking signal to the lubricant pumping module through a signal transceiver; and S23, the electro-hydraulic control system in the lubricant pumping module controlling a power-off normally closed electromagnetic switch valve and a two-position, three-way electromagnetic valve to suck out the lubricant.

In some embodiments, in the operation S3, before the lubricant is completely sucked out, a liquid level sensor may collects a lubricant level in real time and transmits lubricant level data to a DSP; and when the lubricant level is lower than a predetermined value, an electromagnetic valve is turned off, and suction of the lubricant is terminated.

In some embodiments, in operation S2, in the process of sucking out the lubricant, a gravitational accelerometer A detects an angle between a lubricant sucking port and a gravitational acceleration direction in real time; and when the angle is greater than 10°, a stepper motor B is initiated to rotate the lubricant sucking port in real time to allow the lubricant sucking port to face the gravitational acceleration direction to start sucking the lubricant.

In some embodiments, 6-10 lubricant sucking ports are defined and evenly distributed in a circumferential direction, each lubricant sucking port is configured with one electromagnetic valve; the gravitational accelerometer A detects one of the 6-10 lubricant sucking ports that has a minimum angle away from the gravitational acceleration direction; an electromagnetic valve corresponding to the detected lubricant sucking port is turned on for sucking the lubricant.

In some embodiments, in the operation S2, a pressure sensor monitors a pressure inside the pipeline in real time, and calculates to determine whether the pressure inside the pipeline is sufficient to suck out the lubricant. When the pressure is sufficient to suck out the lubricant, a power-off normally closed electromagnetic switch valve is turned on, a two-position three-way electromagnetic valve is conductive and the lubricant is sucked out by the pressure inside the pipeline. When the pressure inside the pipeline is insufficient to suck out the lubricant, the two-position three-way electromagnetic valve is nonconductive, a booster pump is initiated, and the lubricant is removed by secondary pressurization.

In some embodiments, a pumping pressure and a pumping power parameter may be set based on viscosity of the lubricant, density of the lubricant, a deposition distance of the lubricant, and a size of a pumping pipe. Compared to the technology available in the art, technical solutions in the present disclosure have following advantages.

(1) A system and a method for removing the lubricant trapped in the gas transportation pipeline is provided.
(2) The system is highly automatic and efficient.
(3) A pipeline robot is applied, security of operation is improved, and a risk of gas leakage is reduced.

Figure 1:
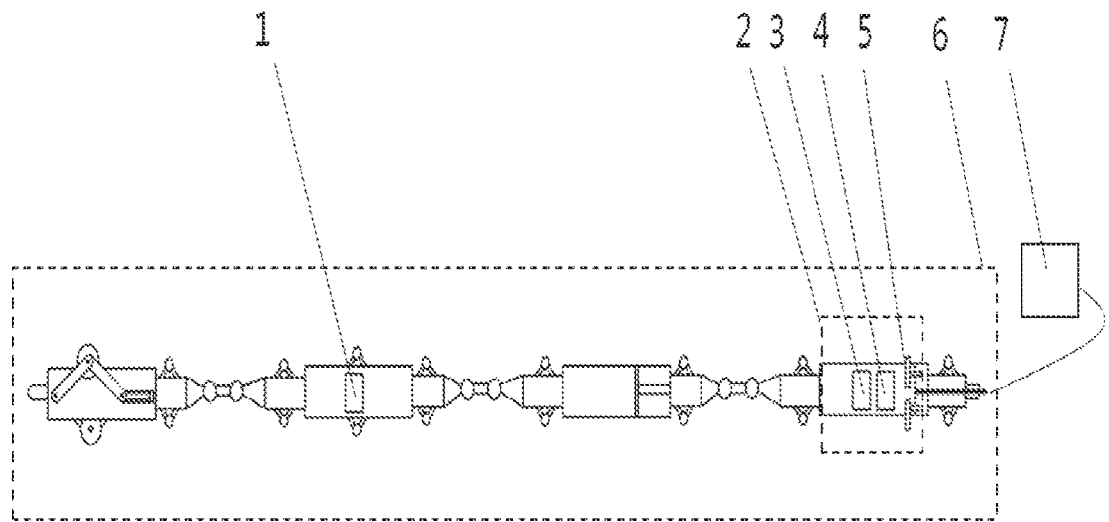
FIG. 1 is a structural schematic view of a pipeline robot according to an embodiment of the present disclosure.

The drawings show a lubricant position detection module 1, a lubricant pumping module 2, an electro-hydraulic control system 3, a data acquisition and processing system 4, a lubricant sucking port 5, a pipeline robot 6, a control terminal system 7, a non-transitory memory (A) 8, a gravitational accelerometer (A) 9, a two-position three-way electromagnetic valve 10, a booster pump 11, a unidirectional valve (A) 12, a unidirectional valve (B) 13, a unidirectional valve (C) 14, an umbilical cable 15, a lubricant collection apparatus 16, a pipeline 17, a relief valve 18, a lubricant sucking port system 19, a power-off normally closed electromagnetic switch valve 20, a pressure sensor 21, a liquid level sensor 22, a power supply module 23, an industrial CCD camera 24, a non-transitory memory (B) 25, a stepper motor (A) 26, an ultrasonic liquid level detection sensor 27, a gravitational accelerometer (B) 28, a unidirectional valve (D) 29, a stepper motor (B) 30, an electromagnetic switch valve 31.

DETAILED DESCRIPTION

Embodiments of the present disclosure will be illustrated by referring to accompanying drawings to understand technical features, objectives and technical effects of the present disclosure more clearly.

The present embodiment provides a system for pumping lubricant in a gas transportation pipeline. The system may include a pipeline robot 6 and a control terminal system 7. As shown in FIG. 1, the pipeline robot 6 is configured with a lubricant position detection module 1, a lubricant pumping module 2, an electro-hydraulic control system 3, a data acquisition and processing system 4, and a lubricant sucking port 5. The pipeline robot 6 may be configured to crawl and serve as a carrier for pumping the lubricant. The total number of lubricant sucking ports 5 may be 6-10. The 6-10 lubricant sucking ports 5 may be evenly distributed, in a circumferential direction.

Figure 2:
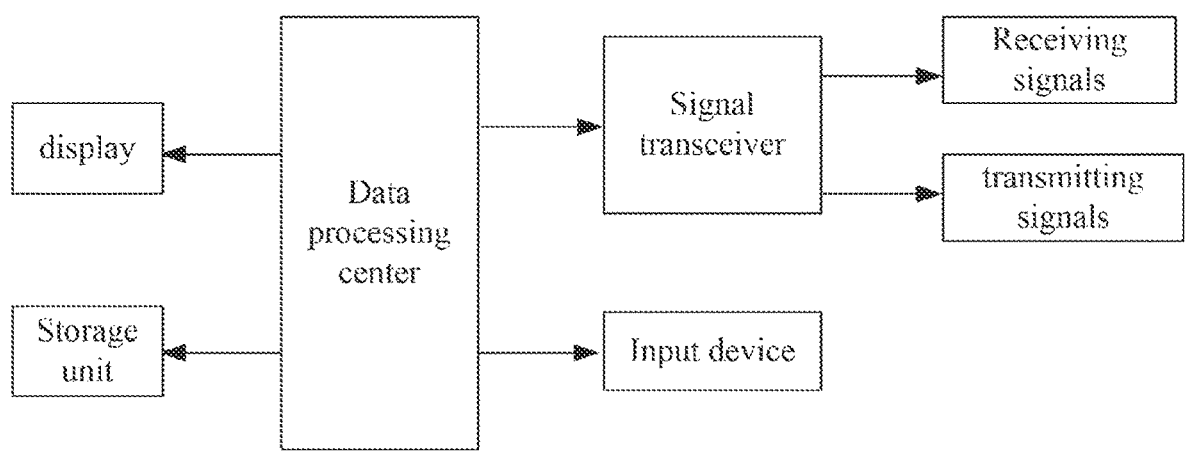
FIG. 2 is a diagram showing composition of a control terminal system according to an embodiment of the present disclosure.

As shown in FIG. 2, the control terminal system may include a data processing center, a signal transceiver, an input device, a storage unit, and a display. Each of the signal transceiver, the input device, the storage unit, and the display may be connected to the data processing center, and may be controlled by a control module of the data processing center. The display may display three-dimensional trajectory position coordinates of the pipeline robot in real time.

Figure 3:
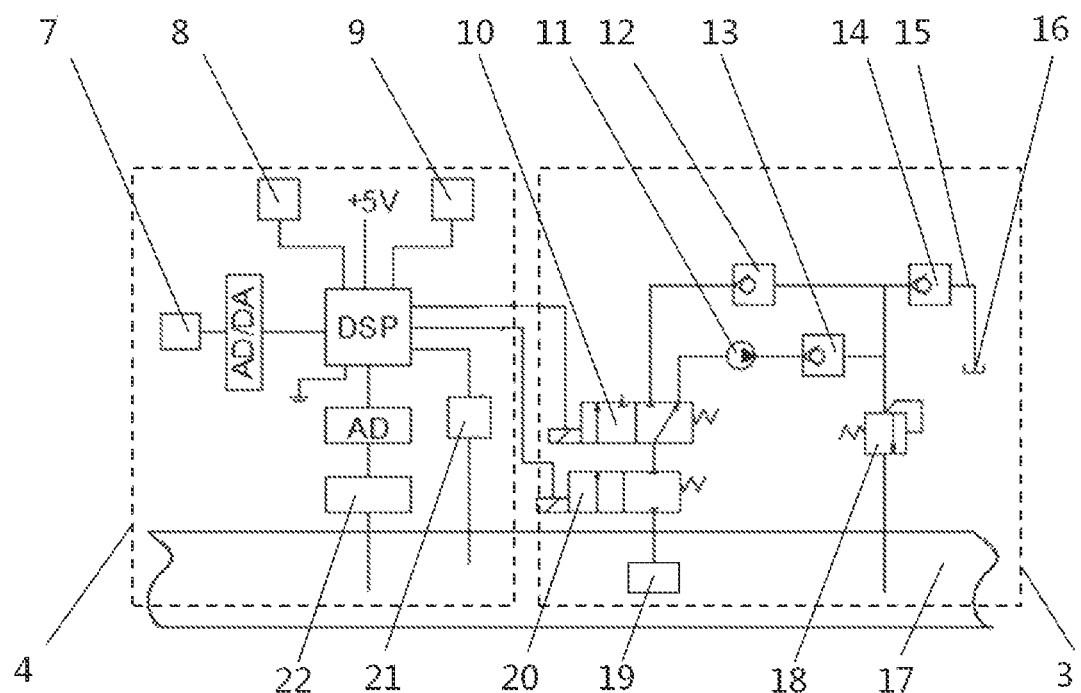
FIG. 3 is a diagram of a lubricant pumping module according to an embodiment of the present disclosure.

As shown in FIG. 3, the lubricant pumping module 2 may include the electro-hydraulic control system 3 and the data acquisition and processing system 4. The electro-hydraulic control system 3 may include a two-position three-way electromagnetic valve 10, a booster pump 11, a unidirectional valve (A) 12, a unidirectional valve (B) 13, a unidirectional valve (C) 14, a lubricant collection apparatus 16, a relief valve 18, a power-off normally closed electromagnetic switch valve 20. Each of the power-off normally closed electromagnetic switch valve 20 and the two-position three-way electromagnetic valve 10 may be independently controlled by a DSP. The power-off normally closed electromagnetic switch valve 20 may be connected to the two-position three-way electromagnetic valve 10 in series. Two outlets of the two-position three-way electromagnetic valve 10 may be connected to the unidirectional valve (A) 12 and the booster pump 11 respectively. The booster pump 11 may be connected in series with the unidirectional valve (B) 13. The relief valve 18, the unidirectional valve (A) 12, and the unidirectional valve (B) 13 may be connected in parallel. The relief valve 18, the unidirectional valve (A) 12, and the unidirectional valve (B) 13 may be connected in series with unidirectional valve (C) 14. The unidirectional valve (C) 14 may further be connected in series with the lubricant collection apparatus 16. The data acquisition and processing system may include a liquid level sensor 22, a pressure sensor 21, a gravitational accelerometer (A) 9, a non-transitory memory (A) 8, an analog-digital converter, and an analog-digital/digital/analog converter. The liquid level sensor 22 may detect a height of the liquid level, i.e., a height of the lubricant level. The pressure sensor 21 may detect a pressure in the pipeline. The gravitational accelerometer (A) 9 may detect a direction of the gravitational acceleration.

Figure 4:
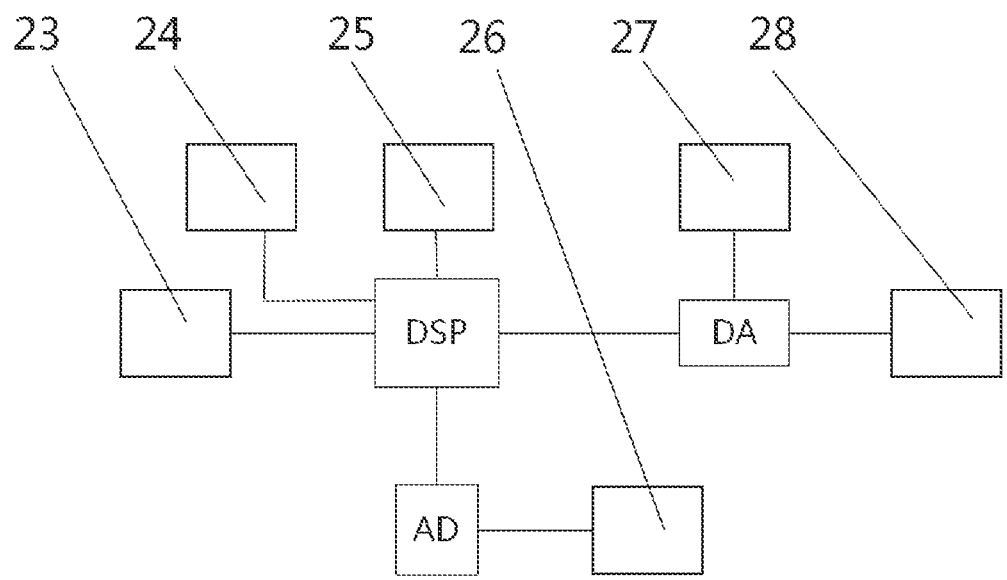
FIG. 4 is a diagram of a module for detecting a lubricant position according to an embodiment of the present disclosure.

As shown in FIG. 4, the lubricant position detection module 1 may include a power supply module 23, an industrial CCD camera 24, a non-transitory memory (B) 25, a stepper motor (A) 26, an ultrasonic liquid level detection sensor 27, and a gravitational accelerometer (B) 28. Each of the stepper motor (A) 26, the ultrasonic liquid level detection sensor 27, and the gravitational accelerometer (B) 28 may be independently controlled by a DSP.

Figure 5:
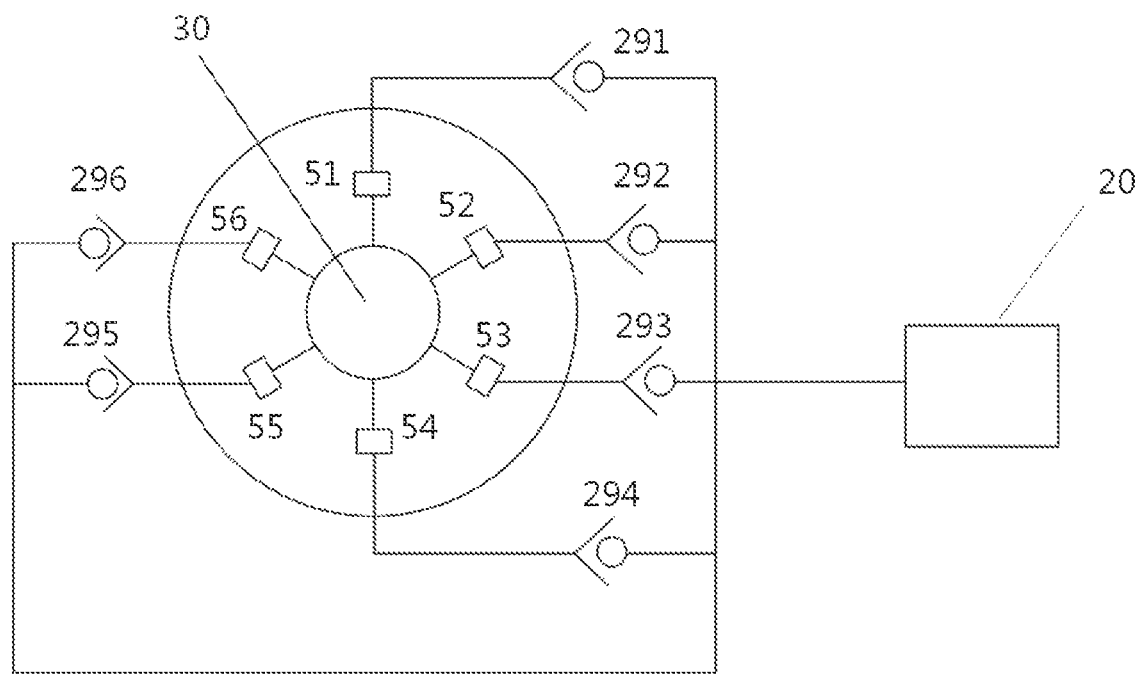
FIG. 5 is a structural schematic view of a lubricant sucking port according to an embodiment of the present disclosure.

As shown in FIG. 5, the unidirectional valve (D) 29 may be the only component that is connected in series between the lubricant sucking port 5 and the power-off normally closed electromagnetic switch valve 20, and the unidirectional valve (D) 29 may be conductive unidirectionally. The stepper motor (B) 30 may be configured out of the lubricant sucking port 5. When a plurality of lubricant sucking ports are configured, the plurality of lubricant sucking ports may be rotated by the stepper motor (B) 30, such that a proper one of the plurality of lubricant sucking ports may be selected by the stepper motor (B) 30 for pumping the lubricant. Where, the lubricant sucking port 5 includes a first lubricant sucking port 51, a second lubricant sucking port 52, a third lubricant sucking port 53, a fourth lubricant sucking port 54, a fifth lubricant sucking port 55 and a sixth lubricant sucking port 56, which are set side by side. The unidirectional valve (D) 29 includes a first unidirectional valve (D) 291, a second unidirectional valve (D) 292, a third unidirectional valve (D) 293, a fourth unidirectional valve (D) 294, a fifth unidirectional valve (D) 295 and a sixth unidirectional valve (D) 296. The first lubricant sucking port 51 is connected with the first unidirectional valve (D) 291, the second lubricant sucking port 52 is connected with the second unidirectional valve (D) 292, the third lubricant sucking port 53 is connected with the third unidirectional valve (D) 293, the fourth lubricant sucking port 54 is connected with the fourth unidirectional valve (D) 294, the fifth lubricant sucking port 55 is connected with the fifth unidirectional valve (D) 295, the sixth lubricant sucking port 56 is connected with the sixth unidirectional valve (D) 296.

Figure 6:
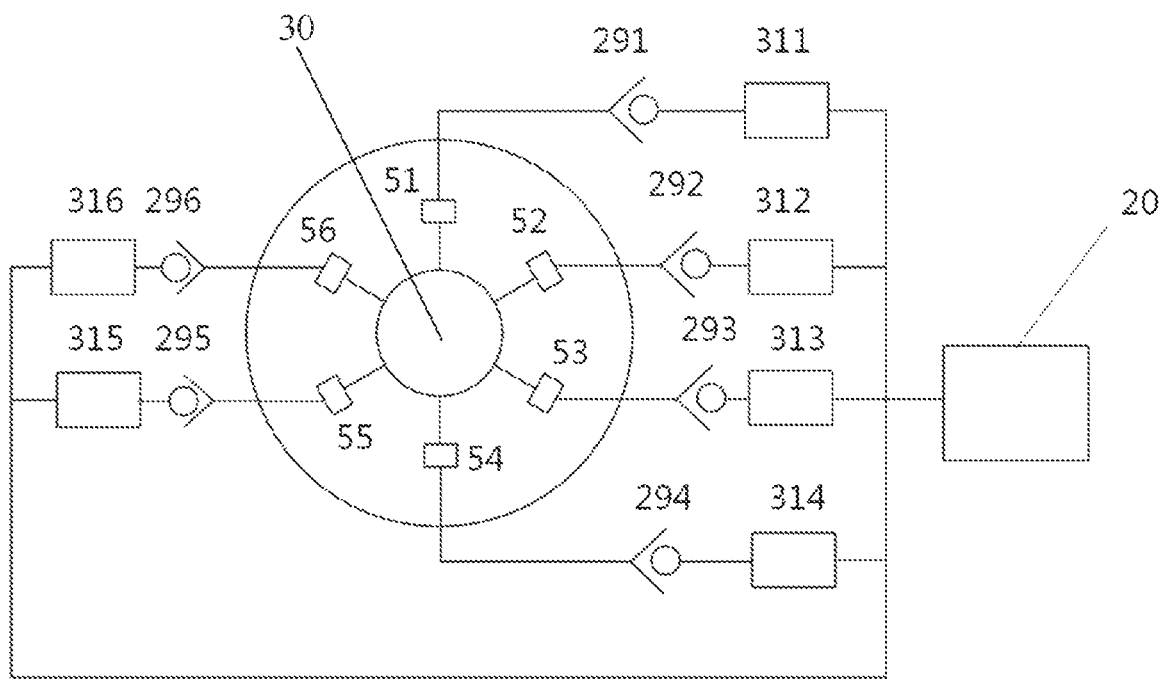
FIG. 6 is another structural schematic view of a lubricant sucking port according to an embodiment of the present disclosure.
Figure 7:
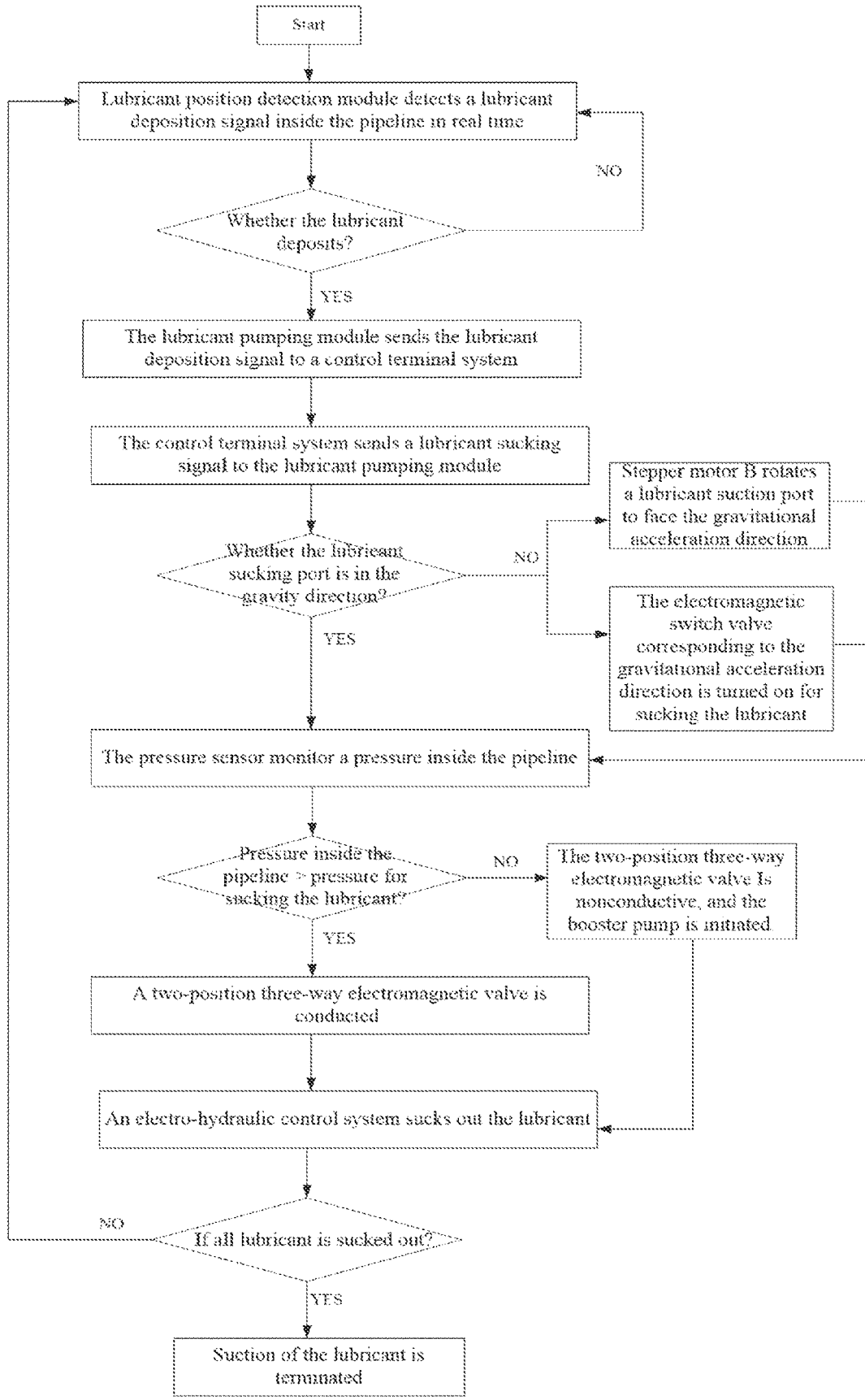
FIG. 7 is a flow chart of pumping the lubricant according to an embodiment of the present disclosure.
Figure 8:
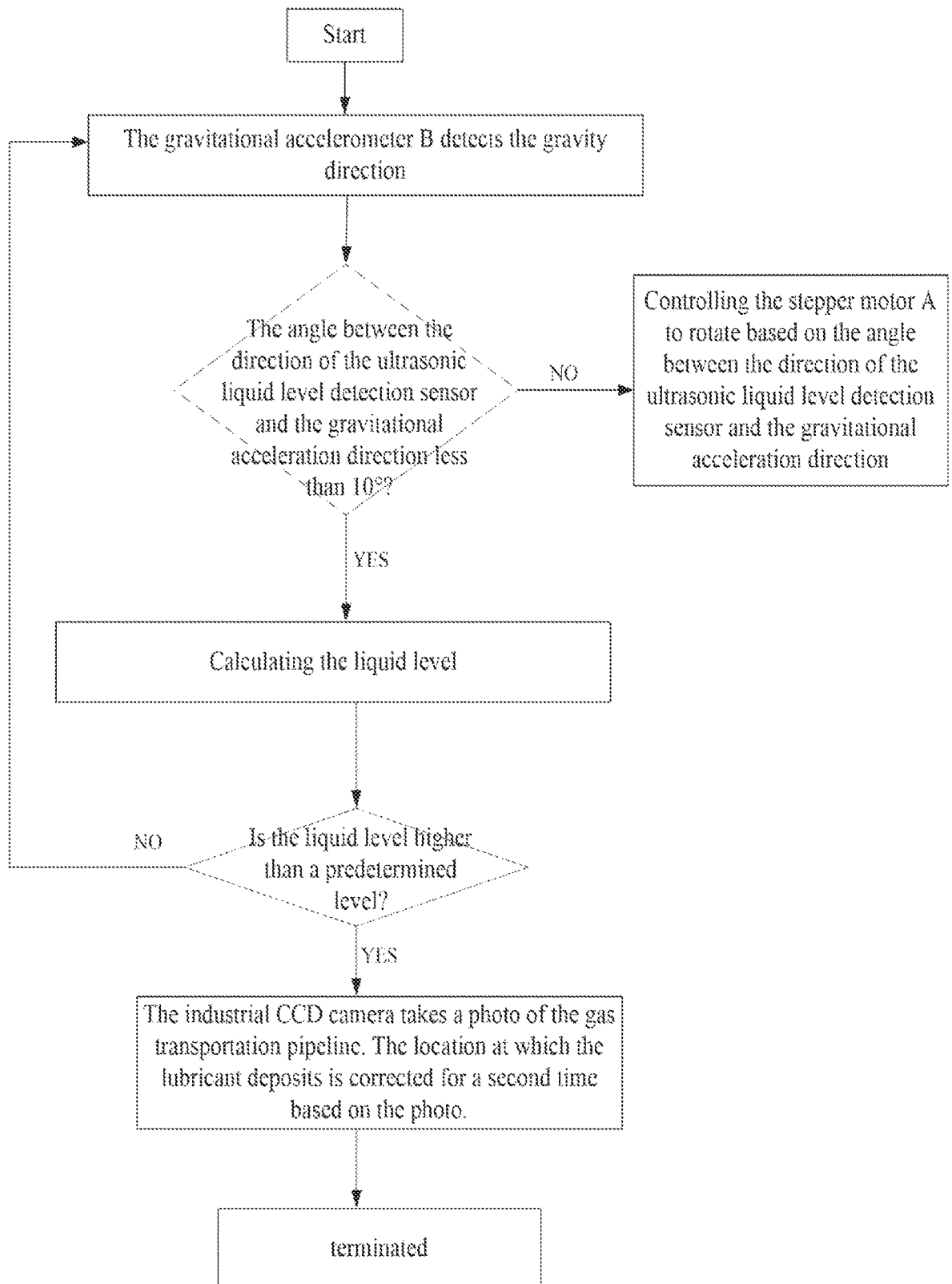
FIG. 8 is a flow chart, of determining a position of accumulated lubricant according to an embodiment of the present disclosure.

As shown in FIG. 6, the unidirectional valve (D) 29 and the electromagnetic switch valve 31 may be connected in series between the lubricant sucking port 5 and the power-off normally closed electromagnetic switch valve 20. The electromagnetic switch valve 31 may be independently controlled. By controlling the electromagnetic switch valve 31 to be conductive or nonconductive, a proper one of the plurality of lubricant sucking ports may be selected for pumping the lubricant. Where the electromagnetic switch valve 31 includes a first electromagnetic switch valve 311, a second electromagnetic switch valve 312, a third electromagnetic switch valve 313, a fourth electromagnetic switch valve 314, a fifth electromagnetic switch valve 315 and a sixth electromagnetic switch valve 316.

The present disclosure may further provide a method for pumping the lubricant in the gas transportation pipeline. The method includes following operations. S1, the lubricant position detection module 1 may monitor a lubricant deposition signal inside the pipeline 17 in real time to determine a location at which the lubricant deposits. S2, the lubricant pumping module 2 may send the lubricant deposition signal to the control terminal system 7. The control terminal system 7 may send a lubricant sucking signal to the lubricant pumping module 2. The electro-hydraulic control system 3 may suck out the lubricant. S3, the lubricant may be completely sucked out, the electromagnetic valve may be turned off, and lubricant suction may be terminated. The operation of determining the location at which the lubricant deposits may include following operations. S11, the lubricant position detection module 1 may calculate the height of the liquid level, i.e., the height of the lubricant level. S12, in response to the height of the liquid level being higher than a predetermined height, the industrial CCD camera 24 may take a photo of the gas transportation pipeline. The location at which the lubricant deposits may be corrected for a second time based on the photo to determine that the lubricant does deposit at the location. The operation S2 may include following operations. S21: When deposition of the lubricant is present, the lubricant pumping module 2 may encode the information and send the encoded information to the control terminal system 7. S22, the data processing center of the control terminal system 7 may process the information and send the lubricant sucking signal to the lubricant pumping module 2 through a signal transceiver. S23, the electro-hydraulic control system 3 in the lubricant pumping module 2 may control the power-off normally closed electromagnetic switch valve 20 and two-position three-way electromagnetic valve 10 to suck out the lubricant. In the operation S3, before the lubricant is completely sucked out, the liquid level sensor 22 may collect the lubricant level in real time and transmit liquid level data to the DSP. When the liquid level is lower than a predetermined value, the electromagnetic valve may be turned off, and suction of the lubricant may be terminated. In a process of sucking out the lubricant in the operation S2, the gravitational accelerometer (A) 9 may detect an angle between the lubricant sucking port 5 and the gravitational acceleration direction in real tune. If the angle is greater than 10°, the stepper motor (B) 30 may be initiated to rotate the lubricant sucking port 5 in real time to allow the lubricant sucking port to face the gravitational acceleration direction to start sucking the lubricant. The process of sucking out the lubricant in the operation S2 may be achieved by performing following operations. 6-10 lubricant, sucking ports 5 may be evenly distributed in the circumferential direction. Each lubricant sucking port 5 may be configured with one electromagnetic valve 31. The gravitational accelerometer A9 may detect which lubricant sucking port 5 has a minimum angle away from the gravitational acceleration direction. A corresponding electromagnetic valve 31 may be turned on for sucking the lubricant. In the operation S2, the pressure sensor 21 may monitor the pressure inside the pipeline 17 in real time, and may calculate to determine whether the pressure inside the pipeline is sufficient to suck out the lubricant. If the pressure is sufficient to suck out the lubricant, the power-off normally closed electromagnetic switch valve 20 may be turned on, the two-position three-way electromagnetic valve 10 may be conductive, and the lubricant may be sucked out by the pressure inside the pipeline. If the pressure inside the pipeline 17 is insufficient to suck out the lubricant, the two-position three-way electromagnetic valve 10 may be nonconductive, the booster pump 11 may be initiated, and the lubricant may be removed by secondary pressurization.

As shown in FIGS. 1-8, a principle of the system for pumping the lubricant in the gas transpiration pipeline may be shown in the following. A body portion of the pipeline robot 6 may be a carrier for various systems of the pipeline robot 6 and may provide interfaces and configuration locations for the various systems configured with the body portion. Movement of the pipeline robot 6 may be achieved based on a support system and an extension-retraction mechanism. The pipeline robot 6 moving forwardly or backwardly may be achieved by a support mechanism and the extension-retraction mechanism in the support system moving alternately. Based on the three-dimensional trajectory of the gas transportation pipeline, the input device in the control terminal system 7 may input a traction speed and a traction force. A pumping pressure and a pumping power parameter may be set based on viscosity of the lubricant, density of the lubricant, a deposition distance of the lubricant, and a size of a pumping pipe. The data processing center may encode the traction speed and the traction force, and may transmit the data to the pipeline robot 6 in the pipeline through the signal transceiver. The pipeline robot 6 may decode the control signal and control proportional directional valves of the support system to change directions in a certain order to achieve the motion of the pipeline robot 6. While the pipeline robot 6 is moving forwardly, the gravitational accelerometer (B) 28 in the lubricant position detection module 1 may detect the angle between the lubricant sucking port 5 and the gravitational acceleration direction in real time. When the angle is greater than 10°, the stepper motor (A) 26 may be initiated to rotate the lubricant sucking port 5 to face the gravitational acceleration direction in real time. When deposition of the lubricant is present, the lubricant pumping module 2 may encode the information and send the encoded information to the control terminal system 7. The control terminal system 7 may decode the received information and display the decoded information on the display module. The control terminal system 7 may determine whether to stop the pipeline robot 6 for sucking the lubricant or allow the pipeline robot 6 continue to move forwardly. After the user determines to stop the pipeline robot 6 for suction, the data processing center may encode information about stopping the pipeline robot 6 for suction and may send the encoded information to the lubricant pumping module 2 through the signal transceiver. Pressure sensor 21 may monitor the pressure inside the pipeline 17 in real time and may calculate to determine whether the pressure inside the pipeline is sufficient to suck out the lubricant. When the pressure is sufficient to suck out the lubricant, then the power-off normally closed electromagnetic switch valve 20 may be turned on, such that the two-position three-way electromagnetic valve 10 may be conductive, and the lubricant may be sucked out by the pressure inside the pipeline. When the pressure inside the pipeline 17 is insufficient to suck out the lubricant, the two-position three-way electromagnetic valve 10 may be nonconductive, the booster pump 11 may be initiated, and the lubricant may be removed by secondary pressurization. Before the lubricant is completely sucked out, the liquid level sensor 22 may collect the liquid level in real time, and transmit the liquid level data to the DSP. When the liquid level is lower than the predetermined value, the electromagnetic valve may be turned off, and lubricant suction may be terminated.

The above description shows only a specific implementation of the present disclosure exemplarily, and is not intended to limit the scope of the present disclosure. Any equivalent changes and modifications made by any person skilled in the art, without departing from the concept and essence of the present disclosure, shall fall within the scope of the present disclosure.

What is claimed is:

1. A pipeline robot, comprising a lubricant sucking module and a lubricant position detection module;
wherein the lubricant pumping module comprises an electro-hydraulic control system and a data acquisition and processing system;
the electro-hydraulic control system comprises a two-position three-way electromagnetic valve, a booster pump, a unidirectional valve A, a unidirectional valve B, a unidirectional valve C, a lubricant collection apparatus, a relief valve, and a power-off normally closed electromagnetic switch valve;
each of the power-off normally closed electromagnetic switch valve and the two-position three-way electromagnetic valve is independently controlled by a DSP;
the power-off normally closed electromagnetic switch valve is connected to the two-position three-way electromagnetic valve in series;
two outlets of the two-position three-way electromagnetic valve are connected to the unidirectional valve A and the booster pump respectively;
the booster pump is connected in series with the unidirectional valve B;
the relief valve, the unidirectional valve A, and the unidirectional valve B are connected in parallel;
the relief valve, the unidirectional valve A, and the unidirectional valve B are connected in series with the unidirectional valve C; and
the unidirectional valve C is further connected in series with the lubricant collection apparatus.

2. The pipeline robot according to claim 1, wherein the lubricant position detection module comprises a power supply module, an industrial CCD camera, a non-transitory memory B, a stepper motor A, an ultrasonic liquid level detection sensor, and a gravitational accelerometer B; and
each of the stepper motor A, the ultrasonic liquid level detection sensor, and the gravitational accelerometer B is independently controlled by a DSP.

3. The pipeline robot according to claim 1, wherein the lubricant sucking module has 6-10 lubricant sucking ports that are evenly distributed in a circumferential direction.

4. The pipeline robot according to claim 1, wherein a unidirectional valve D is the only component that is connected in series between the lubricant sucking port and the power-off normally closed electromagnetic switch valve, and the unidirectional valve D is conductive unidirectionally;
the stepper motor B is configured out of the lubricant sucking port; and
the lubricant sucking ports are rotated by the stepper motor B to select a predetermined one of the lubricant sucking ports for sucking the lubricant.

5. The pipeline robot according to claim 1, wherein a unidirectional valve D and an electromagnetic switch valve are configured to connect in series between the lubricant sucking port and the power-off normally closed electromagnetic switch valve;
the electromagnetic switch valve is independently controlled; and
a predetermined one of the 6-10 lubricant sucking ports is selected for pumping the lubricant by controlling the electromagnetic switch valve to be conductive or non-conductive.

* * * * *